(12) United States Patent
Pak (10) Patent No.: US 8,681,879 B2
(45) Date of Patent: Mar. 25, 2014

(54) METHOD AND APPARATUS FOR DISPLAYING VIDEO DATA

(75) Inventor: Seong-joon Pak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1313 days.

(21) Appl. No.: 11/876,090

(22) Filed: Oct. 22, 2007

(65) Prior Publication Data

US 2008/0240232 A1 Oct. 2, 2008

(30) Foreign Application Priority Data

Mar. 28, 2007 (KR) .................. 10-2007-0030380

(51) Int. Cl.
*H04N 7/12* (2006.01)
*H04N 11/02* (2006.01)
*H04N 11/04* (2006.01)

(52) U.S. Cl.
USPC ............ 375/240.28; 375/240.08; 375/240.01; 375/240.29

(58) Field of Classification Search
None
See application file for complete search history.

(56) References Cited

U.S. PATENT DOCUMENTS

| | | | | |
|---|---|---|---|---|
| 5,835,144 A | * | 11/1998 | Matsumura et al. ..... | 375/240.23 |
| 5,907,660 A | * | 5/1999 | Inoue et al. ............. | 386/264 |
| 5,978,592 A | * | 11/1999 | Wise ..................... | 712/1 |
| 6,363,176 B1 | * | 3/2002 | Numata .................. | 382/233 |
| 6,539,059 B1 | * | 3/2003 | Sriram et al. ........... | 375/240.25 |
| 6,671,320 B1 | * | 12/2003 | Beacken et al. ......... | 375/240.16 |
| 6,987,808 B2 | * | 1/2006 | Mine ..................... | 375/240.03 |
| 7,095,783 B1 | * | 8/2006 | Sotheran et al. ........ | 375/240.01 |
| 7,110,663 B1 | * | 9/2006 | Tsukagoshi et al. ..... | 386/356 |
| 7,251,275 B2 | * | 7/2007 | Wu et al. ................ | 375/240.03 |
| 7,643,559 B2 | * | 1/2010 | Kato et al. ............. | 375/240.23 |
| 2001/0001614 A1 | * | 5/2001 | Boice et al. ............ | 375/240.24 |
| 2002/0090031 A1 | | 7/2002 | Rhee et al. | |
| 2002/0093595 A1 | * | 7/2002 | Sugiyama et al. ...... | 348/683 |
| 2002/0114397 A1 | * | 8/2002 | Todo et al. ............. | 375/240.29 |
| 2002/0122481 A1 | * | 9/2002 | Mine ..................... | 375/240.01 |
| 2002/0136307 A1 | * | 9/2002 | Imura et al. ............ | 375/240.24 |
| 2003/0037337 A1 | * | 2/2003 | Yona et al. .............. | 725/95 |
| 2003/0235247 A1 | * | 12/2003 | Wu et al. ................ | 375/240.03 |
| 2004/0066852 A1 | * | 4/2004 | MacInnis ............... | 375/240.25 |
| 2005/0053158 A1 | * | 3/2005 | Regunathan et al. .... | 375/240.25 |

(Continued)

FOREIGN PATENT DOCUMENTS

| | | |
|---|---|---|
| KR | 19960028489 | 7/1996 |
| KR | 1020020057528 A | 7/2002 |
| KR | 1020060010474 A | 2/2006 |
| KR | 10-2006-0099026 A | 9/2006 |

OTHER PUBLICATIONS

Communication dated Apr. 22, 2011 issued by the Korean Intellectual Property Office in counterpart Korean Patent Application No. 10-2007-0030380.

(Continued)

*Primary Examiner* — Jae Y Lee
*Assistant Examiner* — Andrew Oh
(74) *Attorney, Agent, or Firm* — Sughrue Mion, PLLC (57) ABSTRACT

Provided are a method and apparatus for displaying video data without displaying delay in a video decoder which cannot judge the end of a picture. The method includes receiving video data including a picture formed of blocks; extracting an address of a current block in the received video data; and selectively displaying the picture based on the extracted address of the current block.

21 Claims, 6 Drawing Sheets

(56) References Cited

U.S. PATENT DOCUMENTS

| | | | |
|---|---|---|---|
| 2005/0063466 A1* | 3/2005 | Etoh et al. | 375/240.16 |
| 2005/0084165 A1* | 4/2005 | Yamaguchi et al. | 382/232 |
| 2005/0243932 A1* | 11/2005 | Landsiedel et al. | 375/240.16 |
| 2006/0023792 A1 | 2/2006 | Cho et al. | |
| 2006/0045190 A1* | 3/2006 | Sun et al. | 375/240.27 |
| 2006/0062309 A1* | 3/2006 | Hoshi | 375/240.18 |
| 2007/0153909 A1* | 7/2007 | Lee et al. | 375/240.24 |
| 2007/0171979 A1* | 7/2007 | Eerenberg et al. | 375/240.24 |
| 2007/0280346 A1* | 12/2007 | Tu et al. | 375/240 |

OTHER PUBLICATIONS

Communication dated Sep. 26, 2011 issued by the Korean Intellectual Property Office in counterpart Korean Patent Application No. 10-2007-0030380.

\* cited by examiner

METHOD AND APPARATUS FOR DISPLAYING VIDEO DATA

CROSS-REFERENCE TO RELATED PATENT APPLICATION

This application claims priority from Korean Patent Application No. 10-2007-0030380, filed on Mar. 28, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to displaying video data, and more particularly, to displaying video data without displaying delay in a video decoder which cannot judge the end of a picture.

2. Description of the Related Art

According to the Motion Pictures Expert Group-2 (MPEG-2) video standard, a starting code to recognize the start of a picture exists, but an end code to recognize the end of a picture does not exist. This is because a decoder rarely finds the end of a picture in an elementary stream (ES). Accordingly, a conventional hardware MPEG-2 decoder generally does not recognize the end of a picture, and instead recognizes a header of a next picture or the end of a stream. The end of a stream is identified by a Sequence End Code (SEC) or an End Of Sequence (EOS) code. Based on the recognized data, the MPEG-2 decoder displays a decoded picture on a screen.

Here, the SEC or the EOS code are referred to as the end of a video stream. For video data based on the MPEG-1 or MPEG-2 formats, the term SEC is used and for video data based on the video codec 1 (VC1) and H.264 formats, the term EOS is used.

Video data is formed of several minutes or hours of streams and is successively displayed in most applications. In this case, video is displayed whenever a decoder recognizes a picture starting code. However, in the case of a stream having a large video gap such as a menu screen formed of one picture and a slide show application, decoded video data is stored in a buffer but cannot be displayed.

Therefore, a delay having a large difference between the time the menu screen is switched to the slide show application is substantially displayed on a screen until a Presentation Time Stamp (PTS) of a picture may be displayed.

In particular, in the Blu-ray (next generation optical device) standard, a time interval exists between each of a plurality of video browsing units and sometimes is decoded in a scattered manner. In this case, if a conventional MPEG-2 video decoder is used in a blue-ray disk player, a decoded picture in the buffer of the decoder cannot be displayed until the MPEG-2 video decoder recognizes a starting code of a next picture or a SEC/EOS code.

Figure 1:
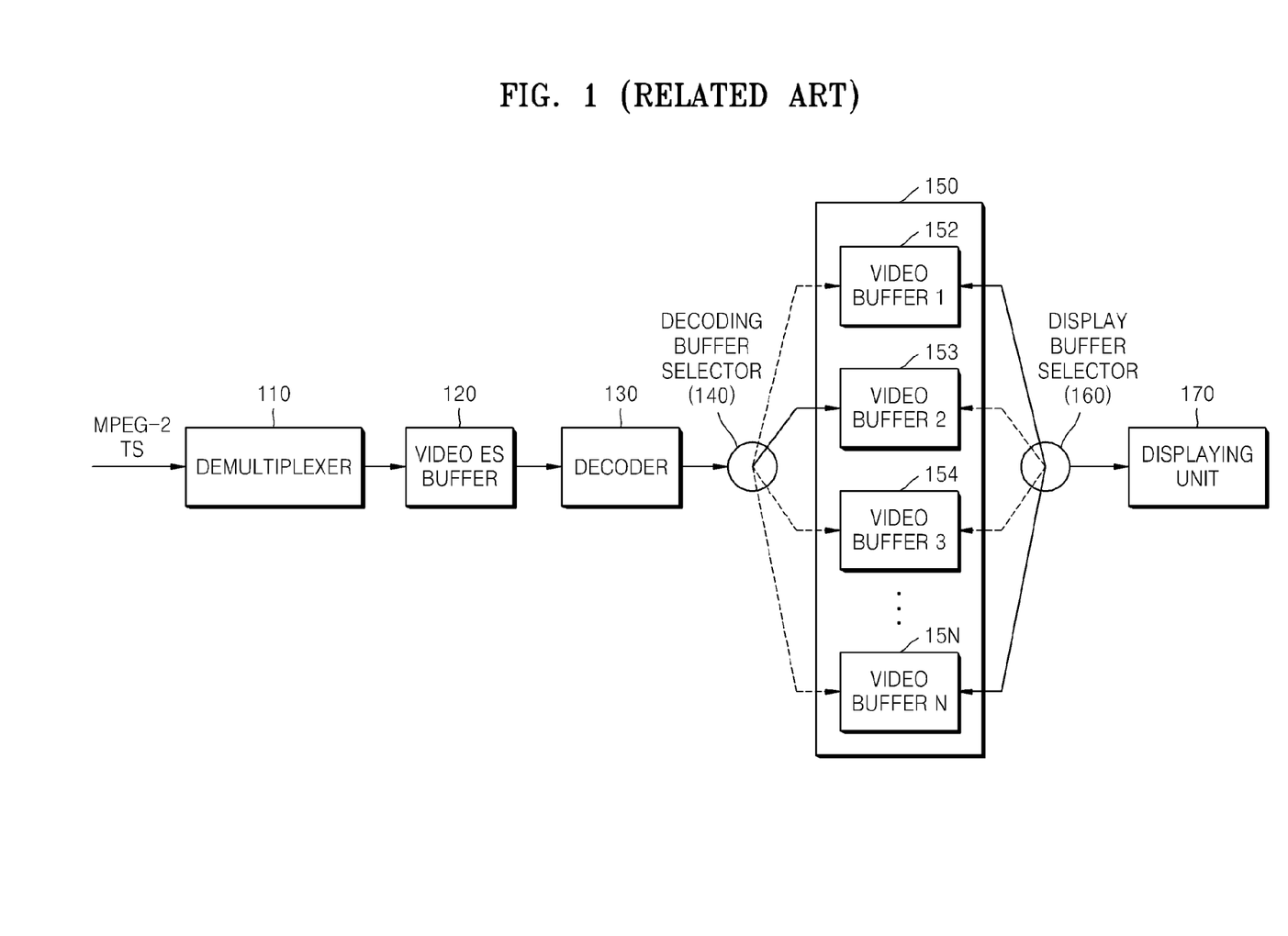
FIG. 1 is a block diagram of a related art MPEG-2 TS data displaying apparatus.

FIG. 1 is a block diagram of a related art MPEG-2 transport stream (TS) data displaying apparatus.

Referring to FIG. 1, the conventional MPEG-2 TS data displaying apparatus includes a demultiplexer 110, a video ES buffer 120, a decoder 130, a decoding buffer selector 140, a video buffer 150, a display buffer selector 160, and a displaying unit 170.

The demultiplexer 110 only parses an MPEG ES in MPEG-TS or MPEG-program script (PS) format and transmits it to the video ES buffer 120.

The video ES buffer 120 stores the MPEG ES parsed in the demultiplexer 110. The stored MPEG ES is transmitted to the decoder 130. In a blue-ray MPEG-TS, the stored MPEG ES is sequentially transmitted to the decoder 130 according to an Arrival Time Stamp (ATS) added to each TS packet of the stored MPEG ES. The video ES buffer 120 is prevented from being overflowed and underflowed according to the ATS The decoder 130 assembles the MPEG-2 video MPEG ES transmitted from the video ES buffer 120 to complete one picture. In FIG. 1, the decoder 130 refers to an element in which only decoding operations are performed. An MPEG-2 decoding system comprises a plurality of modules required in a data storage space and a decoder and is a super ordinate concept as compared with the decoder 130 illustrated in FIG. 1.

The decoding buffer selector 140 selects a video buffer among the video buffers 152, 153, 154 . . . 15N in the video buffer 150 to store the decoded data and the display buffer selector 160 selects a buffer where data to be displayed is stored. If one picture is completed by assembling the decoded data in the video buffer 150, a pointer in the display buffer selector 160 is incremented causing the display buffer selector 160 to display a next picture.

As illustrated in FIG. 1, the decoding buffer selector 140 and the display buffer selector 160 have a pointer difference equating to one picture and thus, only a picture that is decoded is displayed on a screen.

When a picture is completed by assembling data decoded in the video buffer 150, the display buffer selector 160 has to increase its pointer by 1. Therefore the display unit 170 displays a next picture. According to an operation of the conventional MPEG-2 TS data displaying apparatus illustrated in FIG. 1, the demultiplexer 110 only extracts a video ES from an MPEG-TS or an MPEG-PS stream and stores the video ES in the video ES buffer 120. The decoder 130 reads data required to decode a video ES from the video ES buffer 120. If the decoder 130 recognizes a picture starting code or a SEC/EOS code, the decoder 130 increments pointers of both the decoding buffer selector 140 and the display buffer selector 160 by one.

The decoded data is stored in the video buffer 150. The stored data is completed as one picture and the picture is displayed on a screen when the pointer of the display buffer selector 160 is incremented. The display buffer selector 160 sequentially synchronizes with the decoding buffer selector 140 to be operated and thus only a picture that is decoded is displayed on a screen. Accordingly, a pointer difference between the decoding buffer selector 140 and the display buffer selector 160 should be one.

Figure 2:
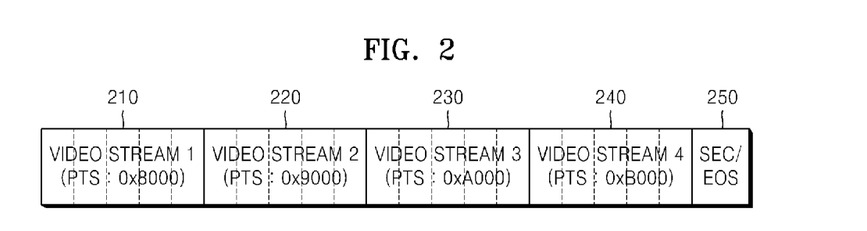
FIG. 2 is a diagram illustrating an example of an MPEG-2 TS stream when a Presentation Time Stamp (PTS) difference between successive pictures is large.

FIG. 2 is a diagram illustrating an example of an MPEG-2 TS stream when a Presentation Time Stamp (PTS) difference between successive pictures is large.

The MPEG-2 TS stream in FIG. 2 is formed of a first video stream 210, a second video stream 220, a third video stream 230, a fourth video stream 240, and a SEC/EOS code 250. The MPEG-2 TS stream in FIG. 2 has a significantly large PTS difference between the first video stream 210 and the second video stream 220 and is used in a menu. In other words, each of the first through fourth video streams 210 through 240 in FIG. 2 is not successively displayed; instead each of the first through fourth video streams 210 through 240 is used as a separate menu.

As an example, in order to use the first video stream 210 having a PTS value of 0x8000, only a picture of an application with PTS 0x8000 210 is read. Here, the SEC/EOS code 250 does not exist after the first video stream 210 having a PTS value of 0x8000. Therefore, the decoder 130 receives and decodes the first video stream 210 having a PTS value of 0x8000 to store in the video buffer 150 However, the decoder 130 does not recognize a SEC/EOS code or the start of a next video stream. Thus, the decoded first video stream 210 cannot be displayed on a screen. Accordingly, in the related art, if only a video decoder is used without any additional processes, a menu corresponding to the first video stream 210 having a PTS value of 0x8000 cannot be displayed.

Figure 3:
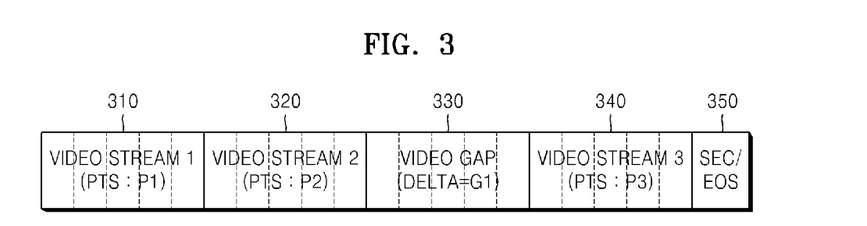
FIG. 3 is a diagram illustrating an example of an MPEG-2 video stream in which a video gap exists.

FIG. 3 is a diagram illustrating an example of an MPEG-2 video stream in which a video gap exists.

Referring to FIG. 3, the MPEG-2 video stream in which a video gap exists includes a first video stream 310, a second video stream 320, a video gap 330, a third video stream 340, and a SEC/EOS code 350.

The PTS of the first video stream 310 is P1, the PTS of the second video stream 320 is P2, and the PTS of the third video stream 340 is P3.

In the present example, the first video stream 310 is currently being displayed on a screen and the second video stream 320 is being decoded. When decoding of the second video stream 320 is completed, the pointer of the display buffer selector 160 should be increased by 1 in order to display the second video stream 320. However, due to the video gap 330, the third video stream 340 is delayed by delta G1 before being recognized by the decoder 130. The video gap 330 in FIG. 3 may correspond to user supplementary service data. The user supplementary service data is generated when user is trying to interrupt on displaying picture. For instance, the user supplementary service data is generated when user load pop-up frame to control reproducing speed or volume on displaying picture.

Until the third video stream 340 reaches the decoder 130, the first video stream 310 is continuously displayed. Ultimately, until the third video stream 340 is input to the decoder 130, the second video stream 320 cannot be displayed and waits in a state indicating that only decoding is completed.

Such time delay may prevent the video data from being displayed in a synchronized fashion. Such a problem is often generated in reproducing a time-based slideshow or a browsable slideshow of a blue-ray disk player in which an MPEG-TS stream including an ATS is used.

As described above, a conventional decoder cannot recognize the end of a picture and instead recognizes only a picture header or a SEC/EOS code. Thus, in the case of a menu screen formed of only one picture and a stream which includes the menu screen has a large video gap, or when only a part of an input stream is displayed, decoded video data is stored in a buffer and not displayed in a synchronized fashion, thereby causing delay.

SUMMARY OF THE INVENTION

The present invention provides a method and apparatus for displaying video data without displaying a delay in the video data.

According to an aspect of the present invention, there is provided a method of displaying video data, including: receiving video data comprising a picture formed of uniform-sized blocks; extracting an address of a current block in the received video data; and selectively displaying the picture based on the address of the extracted current block.

The method may further include decoding the received video data.

When the received video data corresponds to slice information, the method may further include computing a second address of a previous block based on the slice information.

The selectively displaying the picture may include displaying a decoded video data when the address of the extracted current block corresponds to an address of a last block of the picture.

When the extracted address of the current block does not correspond to the address of the last block of the picture, the method may further include storing the address of the current block as a first address of a previous block.

The address of the last block of the picture may be obtained by extracting information on a size of the picture from the received video data, calculating a number of blocks in the picture based on the extracted information on the size of the picture, and allocating the address of the last block to each of the blocks forming the picture.

The address of the current block may be obtained by adding a previously set difference to the first address of the previous block.

The method may further include determining whether an error exists in the address of the current block.

The error may exist when the second address of the previous block computed based on the slice information is different from the first address of the previous block stored.

When an error is determined, the method may further include storing the second address of the previous block measured based on the slice information as the first address of the previous block.

According to another aspect of the present invention, there is provided an apparatus for displaying video data including: a receiving unit which receives video data comprising a picture formed of uniform-sized blocks; a block address extracting unit which extracts an address of a current block in the received video data; and a controlling unit which generates a control signal to selectively display the picture based on the address of the current block extracted by the block address extracting unit; and a displaying unit which displays the picture based on the control signal generated by the controlling unit.

According to another aspect of the present invention, there is provided a computer readable recording medium having embodied thereon a computer program to implement functions of displaying video data, said functions including: receiving video data comprising a picture formed of uniform-sized blocks; extracting an address of a current block in the received video data; and selectively displaying the picture based on the address of the extracted current block.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 4:
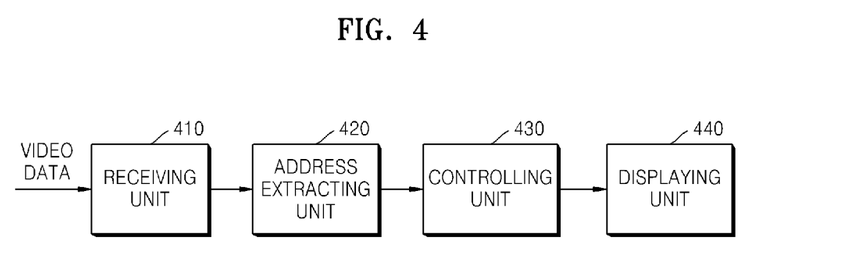
FIG. 4 is a block diagram of an apparatus for displaying video data according to an exemplary embodiment of the present invention.

FIG. 4 is a block diagram of an apparatus for displaying video data according to an exemplary embodiment of the present invention.

Referring to FIG. 4, the apparatus for displaying video data according to this exemplary embodiment of the present invention includes a receiving unit 410, an address extracting unit 420, a controlling unit 430, and a displaying unit 440.

The receiving unit 410 receives video data. The input video data is not limited to MPEG-2 TS or MPEG-2 PS data. In addition, the transmitted data is decoded in order to be delivered to the address extracting unit 420. The received video data includes a picture formed of blocks having uniform sizes. In the case of MPEG-2 data, the blocks may correspond to macro blocks.

A decoding unit (not illustrated) decodes the received video data. According to the current embodiment of the present invention, the decoding unit is disposed between the receiving unit 410 and the address extracting unit 420; but may also be selectively disposed between the address extracting unit 420 and the controlling unit 430. Even when the decoding unit is disposed between the address extracting unit 420 and the controlling unit 430, the address extracting unit 420 extracts block address information from a header of the video data so as to extract an address.

The address extracting unit 420 extracts an address of a current block from video data input to the receiving unit 410. The input video data is formed of at least one block. In the address extracting unit 420, the address of the current input block is extracted.

The controlling unit 430 generates a control signal based on the address extracted by the address extracting unit 420 in order to selectively display video data. As an example, if the current block corresponds to the last block of a picture, displaying of the input video data can be controlled. In this case, if the address of the current block corresponds to the last block of the picture based on the extracted address of the current block, a control signal is generated to display input video data.

The displaying unit 440 selectively displays video data based on the generated control signal.

Figure 5:
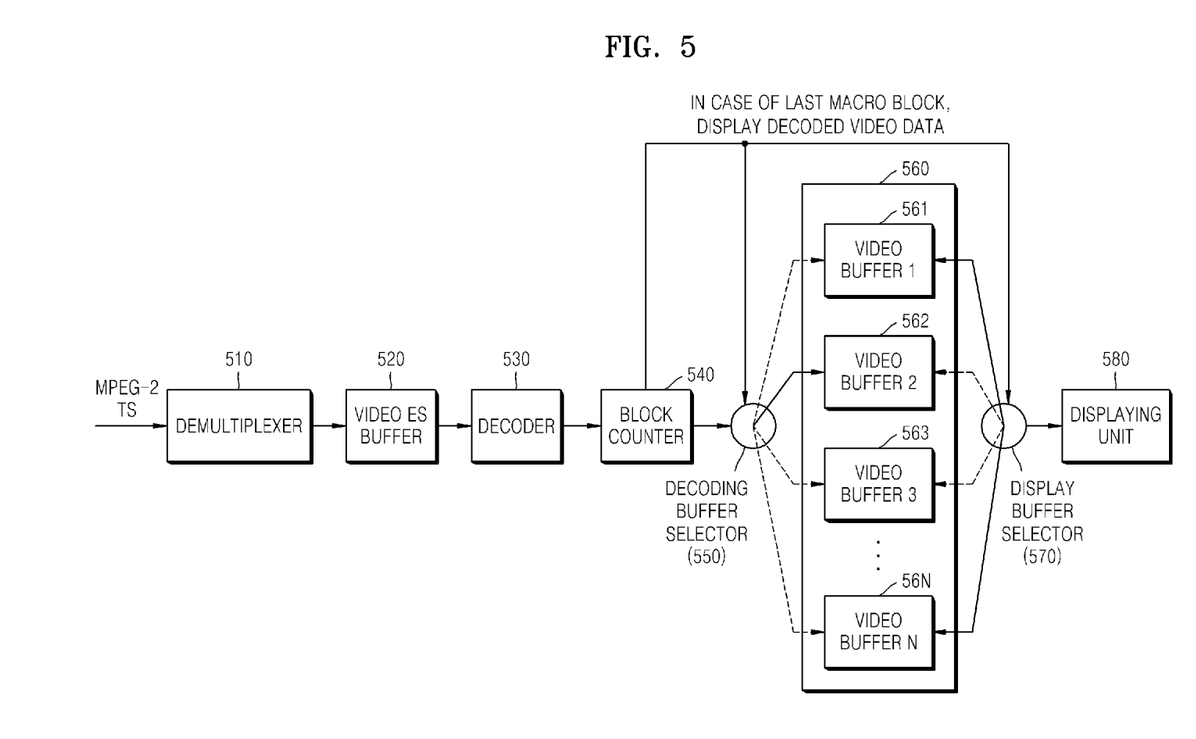
FIG. 5 is a block diagram of an apparatus for displaying video data including a block counter, according to another exemplary embodiment of the present invention.

FIG. 5 is a block diagram of an apparatus for displaying video data including a block counter, according to another exemplary embodiment of the present invention.

Referring to FIG. 5, the apparatus for displaying video data including the block counter according to this exemplary embodiment includes a demultiplexer 510, a video ES buffer 520, a decoder 530, a block counter 540, a decoding buffer selector 550, a video buffer 560, a display buffer selector 570, and a displaying unit 580

The demultiplexer 510 parses only MPEG ES in MPEG-TS or MPEG-PS format to be stored in the video ES buffer 520. In this exemplary embodiment of the present invention, MPEG-TS or MPEG-PS streams are used but video data in other formats can be also used.

MPEG ES parsed from the demultiplexer 510 is stored in the video ES buffer 520. The stored MPEG ES is transmitted to the decoder 530. In a blue-ray disk, a representative application to which this exemplary embodiment is applied, a 4 byte Arrival Time Stamp (ATS) is added to an existing 188 byte MPEG-2 TS to form a 192 byte TS. The ATS is referred to as the arrival time information. The video ES buffer 520 sequentially transmits the MPEG ES to the block counter 540 or the decoder 530.

The ATS determines the speed for transmitting data to the decoder 530. In other words, if the ATS of data is arranged in a scattered manner, data is input at a slower speed to the decoder 530.

The decoder 530 assembles MPEG-2 video ES received from the video ES buffer 520 to complete one picture. Here, the decoded data is stored in one of the video buffers 561, 562, 563 . . . 56N of the video buffer 560 selected by the decoding buffer selector 550.

The block counter 540 may exist in the decoder 530 according to an algorithm, or it may be activated at the same time as the decoder 530, or it may be disposed between the decoder 530 and the video buffer 560. In this exemplary embodiment, the block counter 540 is disposed between the decoder 530 and the video buffer 560, but the present invention is not limited by this configuration. This is obvious to one of ordinary skill in the art.

The block counter 540 is a calculating module to recognize the end of a picture. If the block counter 540 recognizes the end of the picture, the pointers of the decoding buffer selector 550 and the display buffer selector 570 are increased by 1 and an image formed of one picture is displayed on a screen. A detailed description of the block counter 540 will be provided later with reference to FIG. 8.

The decoding buffer selector 550 selects a video buffer from among the video buffers 561, 562, 563 . . . 56N of the video buffer 560 to store the decoded video data received from the decoder 530 and the display buffer selector 570 selects the video buffer in the video buffer 560 that has the stored decoded video data to display the decoded video data. An example of such a case is when decoded data is assembled to complete a picture in the video buffer 560, the pointer in the display buffer selector 570 is incremented by one, and the completed picture is displayed on a screen.

The displaying unit 580 displays the video data stored in the video buffer 560 selected by the display buffer selector 570.

According to this exemplary embodiment as illustrated in FIG. 5, a time difference between video streams exists as in FIG. 3 which makes it difficult to display video data at an appropriate time among video data formed of a single frame, when the stream does not include a SEC/EOS code thereafter. The SEC/EOS code is formed of a single frame and user supplementary data is transmitted afterwards. When an MPEG-2 system parser delivers the SEC/EOS code to the decoder after a predetermined time, and when the PTS of a previous picture and a current picture differs by 66 ms (15 hz) or more, or the stream is arranged irregularly, the video stream can still be displayed according to the set PTS in this exemplary embodiment.

Figure 6:
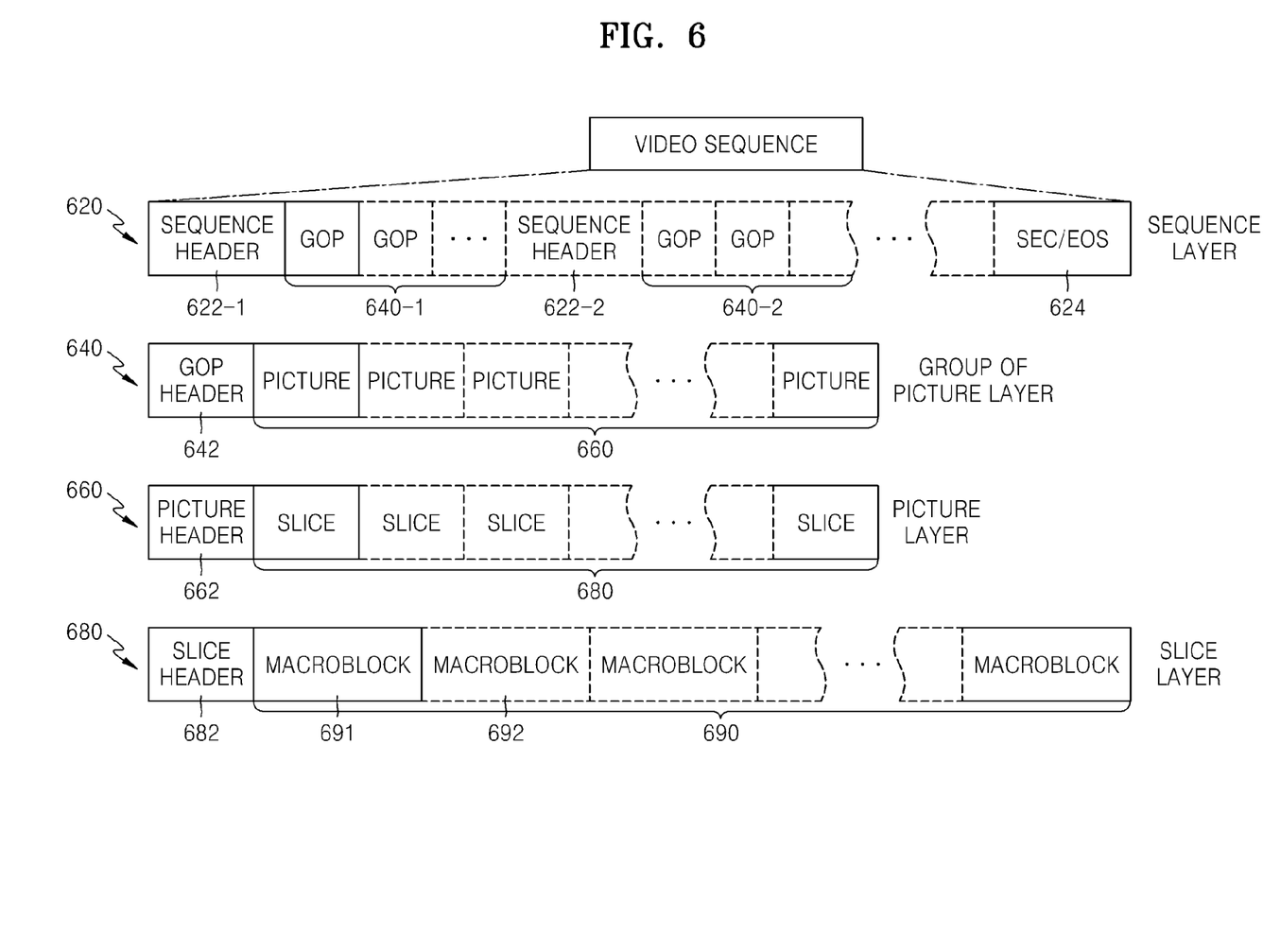
FIG. 6 illustrates a layered structure of an MPEG-2 data format according to an exemplary embodiment of the present invention.

FIG. 6 illustrates a layered structure of an MPEG-2 data format according to an embodiment of the present invention.

Referring to FIG. 6, a video sequence 620 based on the MPEG-2 standard, includes sequence headers 622-1 and 622-2, a group of pictures (GOPs) 640-1 and 640-2, and a SEC/EOS code 624.

The sequence headers 622-1 and 622-2 have a sequence starting code (32 bit) and include sequence information of the GOPs 640-1 and 640-2, respectively. The sequence information includes information such as horizontal resolution and vertical resolution of the GOPs 640-1 and 640-2. The sequence headers 622-1 and 622-2 may also include an extension unit which includes sequence extension information such as video format, chrominance information, and display size.

The SEC/EOS code 624 is a code corresponding to the end of a picture. As discussed earlier, in MPEG-1 and MPEG-2 video data, SEC is used and for video data in the VC1 and H.264 formats, EOS is used.

A GOP 640 is formed of a GOP header 642 and a plurality of pictures 660.

Each of the pictures 660 is formed of a picture header 662 and a plurality of slices 680.

The picture header 662 exists in all pictures and includes information on the displaying time and size of a picture.

Each of the slices 680 is formed of a slice header 682 and arbitrary numbers of macro blocks 690 (macro block 691 and macro block 692 are identified in FIG. 6). One slice 680 includes at least one macro block 690. Vertical positions of slices on the same row are identical.

The slice header 682 has a starting code and thus may be recognized as a header. The slice header 682 includes position information on each of the slices 680 and errors can be corrected through the position information.

The macro blocks 690 are pixel blocks which are further divisions of the slices 680.

In this exemplary embodiment, each of the slices 680 is divided into 16×16 macro blocks 690 and includes addresses of each macro block 690.

In this exemplary embodiment, the end of the picture is calculated by using the address of the macro block 690. However, it is obvious that the end of the picture can be embodied with blocks having different sizes and divided blocks of the macro block. An operation of the present invention will be described with reference to FIG. 7.

Figure 7:
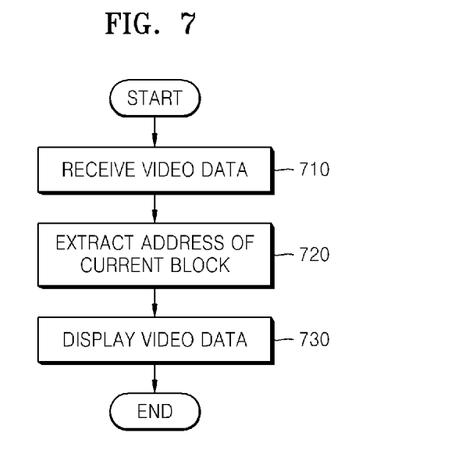
FIG. 7 is a flowchart illustrating a method of displaying video data, which is used to calculate the end of video data, according to an exemplary embodiment of the present invention.

FIG. 7 is a flowchart illustrating a method of displaying video data, which is used to calculate the end of video data, according to an exemplary embodiment of the present invention.

In operation 710, video data is received. The video data is not limited to MPEG-2 TS or MPEG-2 PS data. In addition, decoded video data can be received. The received video data includes a picture formed of uniform-sized blocks. In the case of MPEG-2 data, the blocks may correspond to macro blocks.

In operation 720, an address of a current block is extracted from the video data received in operation 710. The input video data is formed of at least one block and an address of the current block is extracted from information of the input video data.

In operation 730, the video data is selectively displayed based on the address extracted in operation 720. As an example, if the current block corresponds to the last block of the picture, input video data can be displayed. In this case, when the address of the current block corresponds to the last block of the picture, input video data is displayed based on the address of the extracted current block.

Figure 8:
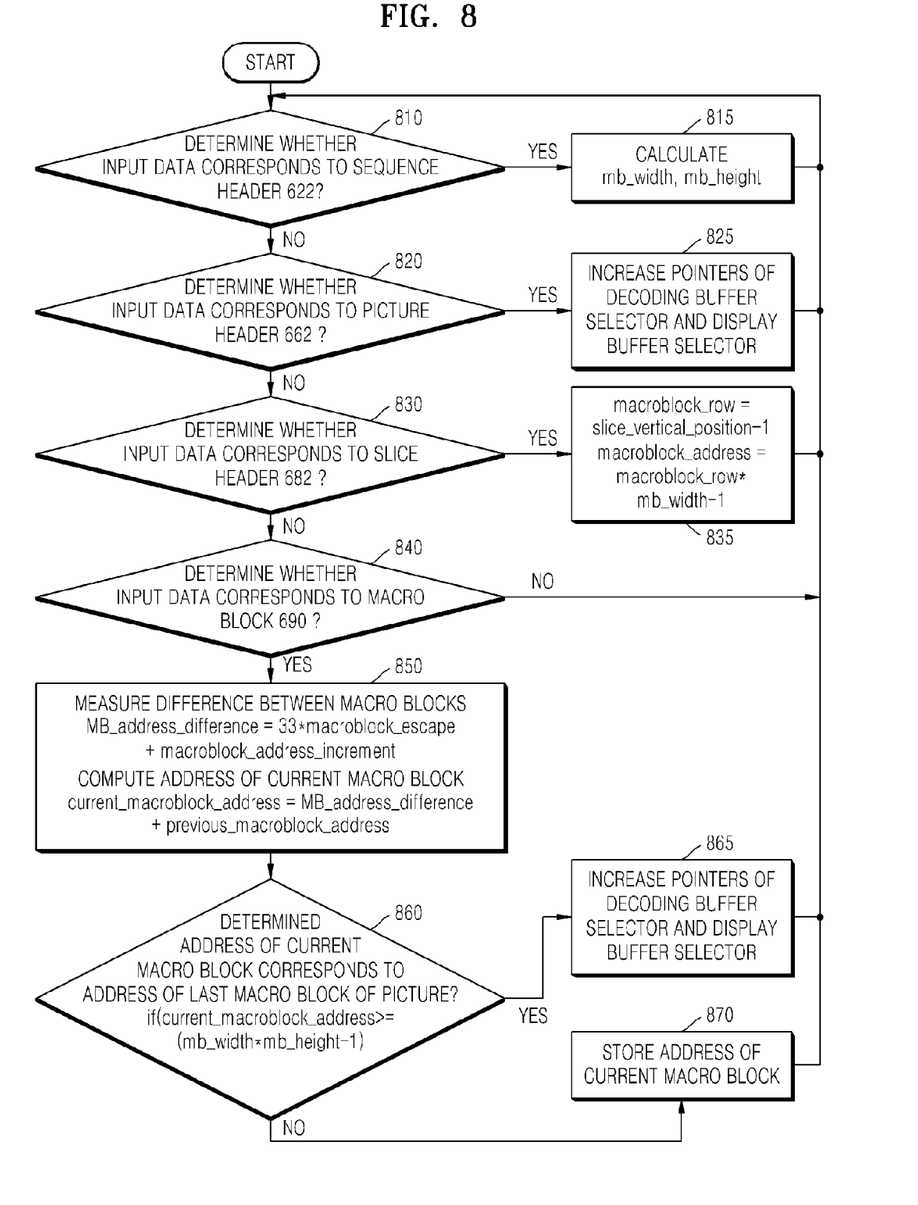
FIG. 8 is a flowchart illustrating a method of displaying video data by using the apparatus for displaying video data including the block counter of FIG. 5, according to another exemplary embodiment of the present invention.

FIG. 8 is a flowchart illustrating a method of displaying video data using the apparatus for displaying video data including the block counter of FIG. 5, according to another exemplary embodiment of the present invention.

Referring to FIG. 8, in operation 810, it is determined whether input data corresponds to the sequence header 622. If the input data is determined as the sequence header 622, the number of the macro blocks 690 that exist in one picture among the GOPs 640 is calculated in operation 815 based on information of the sequence header 622. The calculation if performed according to the width, height, and a mode (progressive/interlaced or field/frame) of the picture existing in the sequence header 622.

For example, if one picture among the GOPs 640 from the sequence header is 1920*1080 pixels (p) and is included in MPEG-2 data in a frame mode, the number of the macro blocks can be calculated by using the equations below.

$$(mb\_width) = (1920+15)/16$$

$$(mb\_height) = (1080+15)/16$$

Therefore, the width and the height of the picture are 120.93 and 68.43 macro blocks, respectively. If the decimal points are eliminated, the width and the height of the picture are 120 and 68 macro blocks, respectively, and thus one picture comprises 120×68 macro blocks. 15 is added to each pixel in the equations above to round up decimal points.

In operation 820, it is determined whether the input data corresponds to the picture header 662. If it is determined that the input data is the picture header 662, the current decoded picture can be displayed. In other words, as shown in operation 825, when the picture header 662 is recognized, the buffer pointer 550 and the display buffer pointer 570 are respectively incremented so that decoding is started in a new buffer and the data decoded previously can be displayed. Such operations are also performed by a conventional decoder. As such, it does not matter if the operations are not included in the method of displaying MPEG-2 TS data by using the apparatus for displaying video data including the block counter of FIG. 5.

In operation 830, it is determined whether the input data corresponds to the slice header 682. If the input data is determined as the slice header 682, in operation 835, the position of the previous macro block is measured from the slice header 682.

According to the MPEG-2 standard, the rows of the macro blocks are measured by using macroblock_row=slice_vertical_position−1, where slice_vertical_position has values from 0x01 to 0xAF. If a slice_vertical_position_extension exists, it becomes macroblock_row=(slice_vertical_position_extension<<7)+slice_slice_vertical_position−1. The position of the previous macro block is measured by using macroblock_address=macroblock_row*mb_width−1. For example, if an 8×6 macro block exists, when the 8×6 macro block meets the slice header in the beginning of the third row, the address of the macro block is measured from the slice header. In other words, the address of the macro block is 2*8−. Since the address of the macro block starts from 0, the address of the last macro block in the second row is measured. This is implemented by the block counter 540.

In operation 840, it is determined whether the input data corresponds to the macro block 690. If the input data is determined as the macro block 690, the block counter 540 is operated to determine whether the current macro block is the macro block 690 that corresponds to the end of the picture.

In operation 850, the address of the input macro block is computed. Hereinafter, the input macro block is referred to as the current macro block 692.

The address of the current macro block 692 can be obtained by adding an address difference between the current macro block 692 and the previous macro block 691 to the address of the previous macro block 691.

According to the MPEG-2 standard, the position of the current macro block 692 is measured by using MB_address_difference=33*macroblock_escape+macroblock_address_increment and
Current_macroblock_address=MB_address_difference+previous_macroblock_address.

The macroblock_escape element is a fixed bit-string "0000 0001 000" which is used when the difference macroblock_address_increment is greater then 33. It causes the value of macroblock_address_increment is incremented by the number of macroblock_escape codewords times by 33. For example, if there are two macroblock_escape codewords preceding the macroblock_address_increment, then 66 is added to the value indicated by macroblock_address_increment.

In other words, the address difference between two macro blocks 691 and 692 is obtained by using a previously set equation. The address of the current macro block 692 is obtained by adding the obtained address difference to the address of the previous macro block 691.

In operation 860, it is determined whether the address of the current macro block obtained in operation 850 corresponds to the address of the last macro block of the picture. If the address of the current macro block is larger than or the same as the address of the last macro block, it is determined that the current macro block corresponds to the last macro block and operation 865 is performed.

In the MPEG-2 standard, since the address of the macro block starts from 0, a check, if (current_macroblock_address)=(mb_width*mb_height−1), is carried out to determine if the address of the current macro block corresponds to the address of the last macro block of the picture.

In operation 865, when the current macro block is determined as the last macro block of the picture in operation 860, the pointers of the decoding buffer selector 550 and the display buffer selector 570 are respectively incremented so as to display the decoded picture.

If it is determined that the current macro block does not correspond to the last macro block of the picture in operation 860, the address value of the current macro block is stored in operation 870.

While not illustrated in FIG. 8, the method may include detecting an error in the address of the previous block.

The address of the current macro block should be determined to determine whether the current macro block corresponds to the last macro block of the picture. However, in this process, only an increment with respect to the address value of the macro block is stored in the header of the macro block and thus the process is slightly complicated. If all video ES is received normally, the address of the previous macro block will be correct and thus the address of the current macro block will also be measured by using current_macroblock_address=MB_address_difference+previous_macroblock_address as set forth in operation 850 above.

However, if an error such as a loss of a portion of the macro block exists in the previous macro block, the address of the current macro block will not be correct using the equation set forth in operation 850. To prevent this, determining whether an error is generated can be included in the method. As an example, in operation 830, the address of the previous macro block is measured from the slice header 682. The address of the previous macro block obtained according to the computed value from the slice header 682 is compared with the address of the previous macro block stored in operation 870. If the computed address based on the slice header 682 does not correspond to the stored address, it can be detected that an error has occurred.

In the present invention, an MPEG-2 decoder function for measuring the end of a picture is further included in a function for identifying the beginning of the picture or a SEC/EOS code. Therefore, problems occurring when a conventional MPEG-2 decoder cannot be used and when a video gap exists in a stream in a blue-ray disk without a SEC/EOS code so as to be delayed to display, can be overcome. Therefore, the picture can be displayed without displaying any delay.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of displaying video data, the method comprising:
receiving video data comprising a picture formed of blocks, each block including a respective address and an address of a last block of the picture to have an address extracted;
extracting the respective address of each block in the received video data;
decoding the received video data; and
displaying the decoded video data if the respective address of the block currently extracted corresponds to the address of the last block of the picture.

2. The method of claim 1, wherein if the respective address of the block currently extracted does not correspond to an address of the last block of the picture, the method further comprises:
storing the extracted address of the block currently extracted as a first address of a previous block.

3. The method of claim 2, wherein the address of the block currently extracted is obtained by adding a previously set difference to the first address of the previous block.

4. The method of claim 2, further comprising:
if the received video data corresponds to slice information, computing a second address of a previous block based on the slice information.

5. The method of claim 4, further comprising:
determining whether an error exists in the address of the block currently extracted.

6. The method of claim 5, wherein the error exists when the computed second address of the previous block based on the slice information is different from the stored first address of the previous block.

7. The method of claim 6, further comprising:
if it is determined that the error exists, storing the computed second address of the previous block based on the slice information as the first address of the previous block.

8. The apparatus of claim 7, wherein the blocks forming the picture are uniform-sized blocks.

9. The method of claim 1, wherein the address of the last block of the picture is obtained by extracting size information of the picture from the received video data, determining a number of blocks in the picture based on the extracted size information of the picture, and allocating the address of the last block of the picture to each of the blocks forming the picture based on the determined number of blocks in the picture.

10. The method of claim 1, wherein the blocks forming the picture are uniform-sized blocks.

11. An apparatus for displaying video data comprising:
a receiving unit which receives video data comprising a picture formed of blocks, each block including a respective address and an address of a last block of the picture to have an address extracted;
a block address extracting unit which extracts the respective address of each block in the received video data; and
a controlling unit which generates a control signal to selectively display the picture based on the respective address of a block currently extracted by the block address extracting unit; and
a displaying unit which displays the picture based on the control signal generated by the controlling unit if the respective address of the block currently extracted corresponds to the address of the last block of the picture.

12. The apparatus of claim 11, further comprising a decoder which decodes the video data received by the receiving unit.

13. The apparatus of claim 11, further comprising:
a database to store the address of the block currently extracted as a first address of a previous block if the respective extracted address of the block does not correspond to an address of the last block of the picture.

14. The apparatus of claim 13, wherein the address of the block currently extracted is obtained by adding a previously set difference to the first address of the previous block stored in the database.

15. The apparatus of claim 13, further comprising:
a previous block computing unit which computes a second address of a previous block if the received video data corresponds to slice information, based on the slice information.

16. The apparatus of claim 15, wherein the controlling unit determines whether an error exists in the address of the block currently extracted, and generates a second control signal if the error exists.

17. The apparatus of claim 16, wherein the error exists if the second address of the previous block computed from the previous block computing unit is different from the first address of the previous block stored in the database.

18. The apparatus of claim 17, wherein, in the database, if the controlling unit generates the second control signal, the second address of the previous block computed based on the slice information is stored as the first address of the previous block.

19. The apparatus of claim 11, wherein the address of the last block of the picture is obtained by extracting size information of the picture from the received video data, determining a number of blocks in the picture based on the extracted size information of the picture, and allocating the respective address to each of the blocks forming the picture based on the determined a number of blocks in the picture.

20. A non-transitory computer readable recording medium having embodied thereon a computer program to implement functions of displaying video data, said functions comprising:
receiving video data comprising a picture formed of blocks, each block including a respective address and an address of a last block of the picture to have an address extracted;
extracting the respective address of each block in the received video data; and
selectively displaying the picture if the respective address of the block currently extracted corresponds to the address of the last block of the picture.

21. The computer readable recording medium of claim 20, wherein the blocks forming the picture are uniform-sized blocks.

* * * * *